United States Patent [19]

Kato et al.

[11] Patent Number: 5,351,264

[45] Date of Patent: Sep. 27, 1994

[54] OPTICAL APPARATUS FOR EMITTING LIGHT AND AUTOMATIC ADJUSTMENT APPARATUS THEREFOR

[75] Inventors: Masatoshi Kato; Yozo Tobo, both of Yokohama; Fumio Ichikawa, Kamakura; Jun Azuma, Kawasaki; Hideaki Uemura, Tokyo, all of Japan

[73] Assignee: Canon Kabushiki Kaisha, Tokyo, Japan

[21] Appl. No.: 16,288

[22] Filed: Feb. 11, 1993

[30] Foreign Application Priority Data

Feb. 14, 1992 [JP] Japan .................. 4-028416

[51] Int. Cl.5 .................................. H01S 3/101
[52] U.S. Cl. .................. 372/107; 372/34; 372/101; 372/108
[58] Field of Search .............. 372/107, 34, 101, 108

[56] References Cited

U.S. PATENT DOCUMENTS 4,918,702 4/1990 Kimura .................. 372/34
5,058,124 10/1991 Cameron et al. .......... 372/107

FOREIGN PATENT DOCUMENTS 3413748 10/1985 Fed. Rep. of Germany .
0094274 11/1983 France .
60-242691 12/1985 Japan .
61-233339 10/1986 Japan .
62-31037 2/1987 Japan .
62-278515 12/1987 Japan .
1181488 7/1989 Japan .
1238612 9/1989 Japan .
3-68907 3/1991 Japan .

Primary Examiner—Georgia Y. Epps
Attorney, Agent, or Firm—Fitzpatrick, Cella, Harper & Scinto

[57] ABSTRACT

An optical apparatus (23) for emitting light is constituted by a fixation holder (8) fixed to a predetermined positioning fixation jig via a fixation plate (8a), a lens-barrel (10), fitted on a cylindrical portion of the fixation holder (8) via an annular gap (19), and formed of a transparent material, for holding a collimator lens (2), and a semi-conductor laser light source (1) fitted under pressure in the fixation holder (8). An ultraviolet curing adhesive (18) is uniformly filled in the gap (19). Before the ultraviolet curing adhesive (18) is cured, the lens-barrel (10) is movable in an optical axis direction (Z) and in two-dimensional directions (directions of arrows X and Y) on a plane perpendicular to the optical axis direction (Z) with respect to the fixation holder (8).

5 Claims, 12 Drawing Sheets

OPTICAL APPARATUS FOR EMITTING LIGHT AND AUTOMATIC ADJUSTMENT APPARATUS THEREFOR

BACKGROUND OF THE INVENTION

1. Field of the Invention

The present invention relates to an optical apparatus for emitting light such as a laser beam collimator unit used in an image recording apparatus for recording an image by scanning a laser beam modulated according to an image signal on a recording medium, or a pickup unit of an optical disk using a semi-conductor laser light source, and to an automatic adjustment apparatus therefor.

2. Related Background Art

In recent years, image recording apparatuses such as laser beam printers (LBPs) for recording an image by scanning a laser beam have been widely used. A laser scanning apparatus used in the image recording apparatus will be described below with reference to FIG. 15.

A semi-conductor laser light source 1X, a collimator lens 2X, an imaging optical system 3X, a polygonal mirror 4X as a deflector, an $f\theta$ lens 5X comprising a spherical lens, a toric lens and the like, and a photosensitive drum 6X as a recording medium are arranged in the order named along an optical path. A laser beam modulated according to an image signal and emitted from the semi-conductor laser light source 1X is collimated by the collimator lens 2X, and the collimated beam is transmitted through the imaging optical system 3X. The beam is then deflected and scanned by the polygonal mirror 4X, and forms an image on the photosensitive drum 6X by the $f\theta$ lens 5X. In this manner, in general, light output from the semi-conductor laser light source 1X radially diverges from the light emitting point. For this reason, when the laser light source is used in, e.g., an LBP, an optical apparatus for emitting light (a laser unit) for collimating output light using the collimator lens 2X is used.

FIG. 16 is a longitudinal sectional view of a conventional optical apparatus for emitting light (laser unit) of this type. The semi-conductor laser light source 1X is urged against a base 7X by an electrical circuit board 9X and a spring 11X. The electrical circuit board 9X is fixed to the base 7X by a screw 13X. A hollow holder 8X formed in a substantially convex shape mounts therein a lens-barrel 10X which incorporates a collimator lens 2X.

Upon adjustment of the focusing position and the irradiating position, the lens-barrel 10X is moved in an optical axis direction (a direction of an arrow A in FIG. 16), and is then held at a position where the diameter of a laser beam transmitted through the collimator lens 2X has a minimum value. Thereafter, an adhesive (not shown) is filled from a hole 14X into the holder 8X to fix the lens-barrel 10X to the holder 8X, thus adjusting the focusing position. Then, the base 7X of the semi-conductor laser light source 1X is two-dimensionally moved on a plane perpendicular to the optical axis of the light source 1X, so that the central axis of the lens-barrel 10X coincides with the optical axis of the light source 1X. After the position adjustment, the base 7X is fixed to the holder 8X by a screw 12X, thus adjusting the irradiating position.

Upon adjustment of the irradiating position, when the focusing position in the optical axis direction is shifted due to, e.g., deformation of the holder 8X, the optical apparatus for emitting light is discarded as a defective product. Alternatively, the adhesive is removed, and the lens-barrel 10X is moved in the optical axis direction again to correct the shift of the focusing position. Thereafter, an adhesive (not shown) is filled from the hole 14X into the holder 8X to fix the lens-barrel 10X to the holder 8X.

However, in the conventional optical apparatus for emitting light described above, there arise the following problems (1), (2), and (3):

(1) Since the focusing position and the irradiating position are adjusted by moving different members, the focusing position in a focusing direction is easily shifted upon adjustment of the irradiating position after the adjustment of the focusing position. Therefore, the focusing position must be adjusted again.

(2) Upon adjustment of the irradiating position, since the base for supporting the semi-conductor laser light source is fixed to the holder using a screw, a positional shift easily occurs, and this adjustment requires much time and skill.

(3) Since the holder as a member for adjusting the focusing position in the optical axis direction, and the base as a member for adjusting the irradiating position in a direction perpendicular to the optical axis are required, the number of components is increased, resulting in an increase in cost.

SUMMARY OF THE INVENTION

The present invention has been made in consideration of the conventional problems, and has an object to provide an optical apparatus for emitting light, which spatially adjusts focusing and irradiating positions by moving a single member, and then fixes the member by an adhesive so as to shorten the adjustment time, and to reduce cost by decreasing the number of components.

It is another object of the present invention to provide an automatic adjustment apparatus for an optical apparatus for emitting light, which adjustment apparatus allows automatic adjustment of the focusing and irradiating positions with high precision.

In order to achieve the above objects, according to the present invention, there is provided an optical apparatus for emitting light, comprising a semi-conductor laser light source, a fixation holder for holding the semi-conductor laser light source, a collimator lens for collimating a laser beam emitted from the semi-conductor laser light source, and a lens-barrel being a substantially hollow member formed of a transparent material, for incorporating and holding the collimator lens, having collars on an outer surface thereof, being formed with slits extending in an optical axis direction on a portion opposite to the collimator lens with respect to the collars, and being fitted onto the fixation holder via a predetermined gap at the portion where the slits are formed so that the lens-barrel is movable in the optical axis direction and in two-dimensional directions on a plane perpendicular to the optical axis direction, wherein the lens-barrel is positioned and fixed to the fixation holder by curing an adhesive filled in the gap in the fitting portion between the lens-barrel and the fixation holder.

The lens-barrel and the portion of the fixation holder onto which the lens-barrel is fitted, each have a substantially cylindrical shape.

Furthermore, there is also provided an automatic adjustment apparatus for adjusting focusing and irradiating positions of the optical apparatus for emitting light of the present invention, comprising positioning fixation means for positioning and fixing the fixation holder, clamp means for holding the collars of the lens-barrel, a three-dimensional positioning mechanism, mounting the clamp means, for moving and positioning the lens-barrel held by the clamp means in the optical axis direction and in two-dimensional directions on a plane perpendicular to the optical axis direction, first position detection means for detecting a coarse irradiating position in the two-dimensional directions of a laser beam transmitted through the collimator lens, second position detection means for detecting an outer diameter and a central position in the two-dimensional directions of the laser beam transmitted through the collimator lens, control means for determining based on the input irradiating position detected by said first position detection means whether the irradiating position is located within a specified range or not, for controlling said three-dimensional positioning mechanism so as to move the lens-barrel to a position where the second position detection means detects that the outer diameter and the central position in the two-dimensional directions of the laser beam are respectively a minimum value and a proper position if the irradiating position falls within the specified range, and controlling the three-dimensional positioning mechanism so as to move the lens-barrel to a position where the irradiating position falls within the specified range if the irradiating position falls outside the specified range, thereafter, controlling the three-dimensional positioning mechanism so as to move the lens-barrel to the position where the second position detection means detects that the outer diameter and the central position in the two-dimensional directions of the laser beam are respectively a minimum value and a proper position, and an ultraviolet ray radiating device for curing the adhesive after said positioning.

There is provided another automatic adjustment apparatus comprising positioning fixation means for positioning and fixing the fixation holder, clamp means for holding the collars of the lens-barrel, a three-dimensional positioning mechanism, mounting the clamp means, for moving and positioning the lens-barrel held by the clamp means in the optical axis direction and in two-dimensional directions on a plane perpendicular to the optical axis direction, first position detection means for detecting a coarse irradiating position in the two-dimensional directions of a laser beam transmitted through the collimator lens, second position detection means for detecting a peak value of a light amount and a central position in the two-dimensional directions of the laser beam transmitted through the collimator lens, control means for determining based on the input irradiating position detected by the first position detection means whether the irradiating position is located within a specified range or not, for controlling said three-dimensional positioning mechanism so as to move the lens-barrel to a position where the second position detection means detects that the peak value of the light amount and the central position in the two-dimensional directions of the laser beam are respectively a maximum value and a proper position if the irradiating position falls within the specified range, and controlling said three-dimensional positioning mechanism so as to move the lens-barrel to a position where the irradiating position falls within the specified range if the irradiating position falls outside the specified range, thereafter, controlling the three-dimensional positioning mechanism so as to move the lens-barrel to the position where the second position detection means detects that the peak value of the light amount and the central position in the two-dimensional directions of the laser beam are respectively a maximum value and a proper position, and an ultraviolet ray radiating device for curing the adhesive after said positioning.

According to one aspect of the present invention with the above arrangement, when a current is supplied to the semi-conductor laser light source to cause it to emit light, a laser beam emitted from the semi-conductor laser light source is substantially collimated by the collimator lens incorporated in the lens-barrel. Upon adjustment of the focusing and irradiating positions, the lens-barrel is moved in the optical axis direction by holding the collars of the lens-barrel which holds the collimator lens, and the lens-barrel is held at a position where the diameter of the laser beam has a minimum value, thus adjusting the focusing position. The lens-barrel is then two-dimensionally moved on a plane perpendicular to the optical axis direction, thereby adjusting the irradiating position. Then, an ultraviolet ray is radiated onto the lens-barrel from the ultraviolet ray radiating device to cure an ultraviolet curing adhesive, thereby fixing the lens-barrel to the fixation holder.

As described above, according to the present invention, the focusing and irradiating positions can be adjusted by moving the lens-barrel alone as an adjustment member. The lens-barrel is formed of a transparent material, which allows easy transmission of an ultraviolet ray, so as to quickly cure the ultraviolet curing adhesive. In addition, slits extending in the optical axis direction are formed in a fitting portion of the lens-barrel onto the fixation holder so as to shorten the curing time, to minimize a positional shift of the collimator lens caused by thermal deformation of the lens-barrel upon radiation of the ultraviolet ray, and To uniformly fill the adhesive. Furthermore, in order to perform adjustment of the focusing position in the optical axis direction and adjustment of the irradiation position on the plane perpendicular to the optical axis direction, a gap is formed between the outer surface of the fixation holder and the inner surface of the lens-barrel, and the lens-barrel has the collars as members for holding the lens-barrel upon adjustment of these positions.

According to another aspect of the present invention, when it is detected that the irradiating position of a laser beam transmitted through the collimator lens falls with a specified value range, the control means controls to drive the three-dimensional positioning mechanism until the second position detection means detects that the outer diameter and irradiating position of the laser beam respectively reach a minimum value and a proper irradiating position. Thus, the lens-barrel is moved by the three-dimensional positioning mechanism in the optical axis direction, and in two-dimensional directions on the plane perpendicular to the optical axis, and is held at a three-dimensionally proper position, thus ending adjustment of the focusing and irradiating positions.

On the other hand, when it is detected that the irradiating position of a laser beam transmitted through the collimator lens falls outside the specified value range, the control means controls to drive the three-dimensional positioning mechanism until the irradiating position of the laser beam falls within the specified value range. Thus, the lens-barrel is moved by the three-dimensional positioning mechanism in the two-dimensional directions on the plane perpendicular to the optical axis direction, and the irradiating position of the laser beam falls within the specified value range. Thereafter, the control means controls to drive the three-dimensional positioning mechanism until the outer diameter and irradiating position of the laser beam respectively reach a minimum value and a proper irradiating position. Thus, the lens-barrel is moved by the three-dimensional positioning mechanism in the optical axis direction, and in two-dimensional directions on the plane perpendicular to the optical axis, and is held at a three-dimensionally proper position, thus ending adjustment of the focusing and irradiating positions.

DETAILED DESCRIPTION OF THE PREFERRED EMBODIMENTS

The preferred embodiments of the present invention will be described hereinafter with reference to the accompanying drawings.

Figure 1:
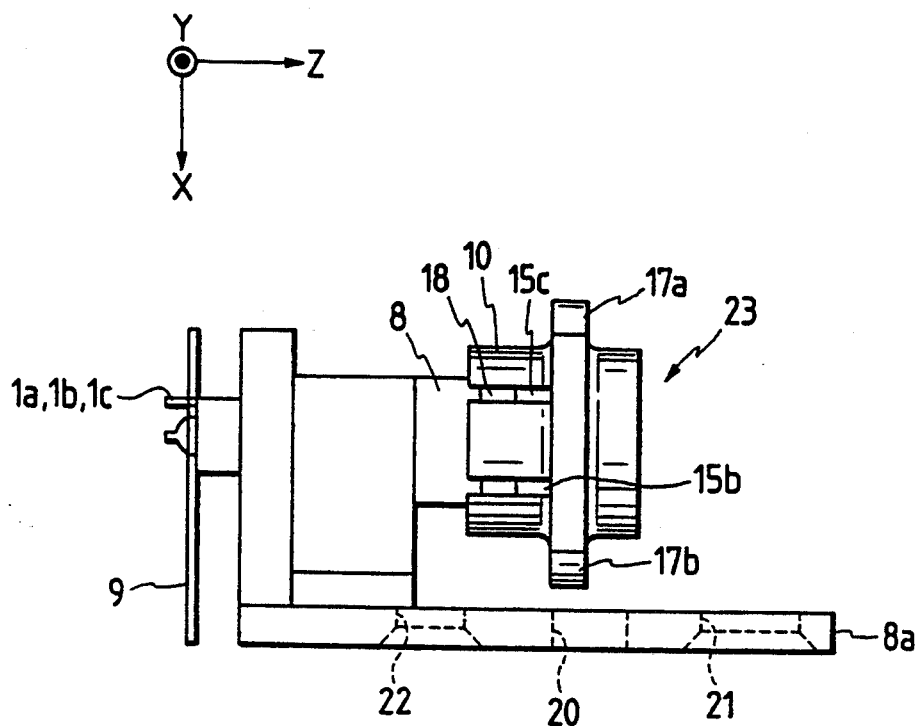
FIG. 1 is a side view of an optical apparatus for emitting light according to an embodiment of the present invention.
Figure 3:
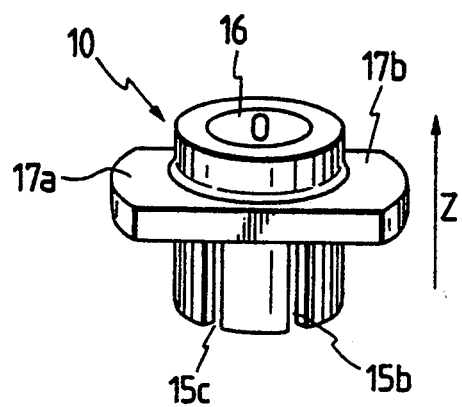
FIG. 3 is a perspective view of a lens-barrel shown in FIGS. 1 and 2.
Figure 2:
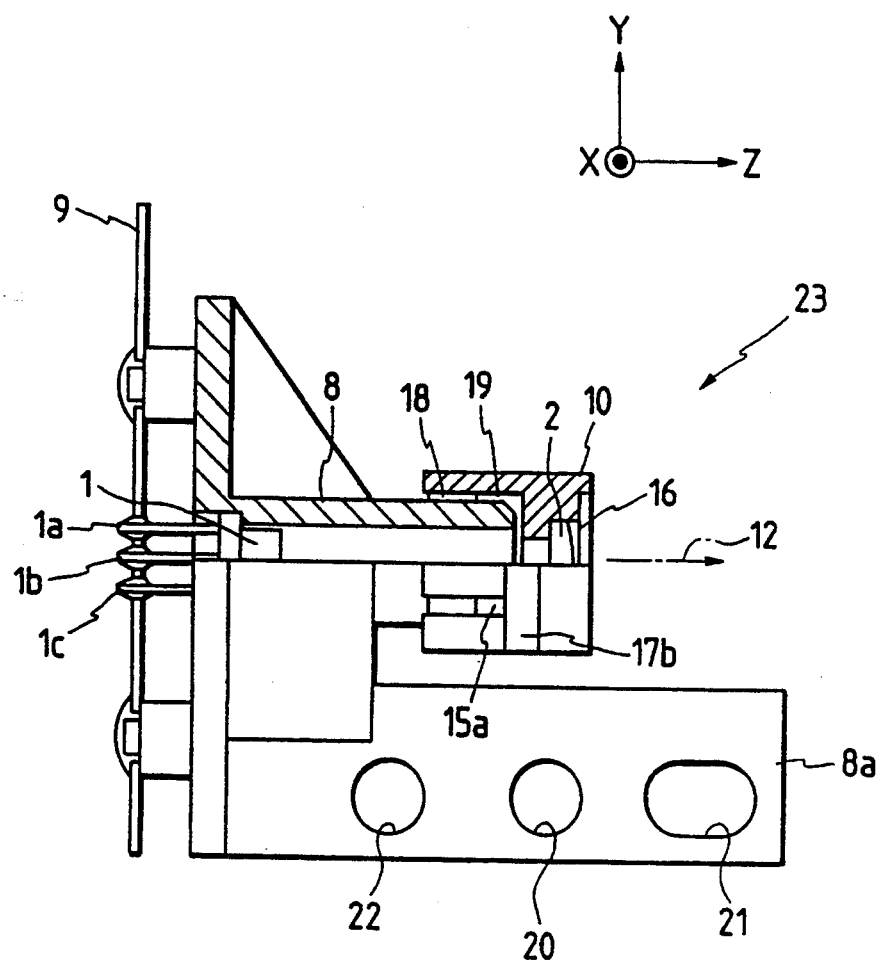
FIG. 2 is a top view showing a partial section of FIG. 1.

FIG. 1 is a side view of an optical apparatus for emitting light according to an embodiment of the present invention, FIG. 2 is a top view showing a partial section of FIG. 1, and FIG. 3 is a perspective view of a lens-barrel shown in FIGS. 1 and 2.

As shown in FIGS. 1, 2, and 3, an optical apparatus 23 for emitting light according to this embodiment includes a metal fixation holder 8 integrally comprising a fixation plate 8a on its lower portion, a lens-barrel 10 mounted on a cylindrical portion of the fixation holder 8 and formed of a transparent material, and an electrical circuit board 9 attached to a side plate of the fixation holder 8.

A positioning hole 22, a positioning elongated hole 21, and a fixation screw hole 20 (to be described later) are formed in the fixation plate 8a of the fixation holder 8. A semi-conductor laser light source 1 is fitted under pressure in one end portion of the cylindrical portion of the fixation holder 8, and three terminals 1a, 1b, and 1c of the semi-conductor laser light source 1 are connected to the electrical circuit board 9 by soldering. When a current is supplied to the laser light source 1 through the terminals 1a, 1b, and 1c, a laser beam 12 is emitted from the semi-conductor laser light source 1 in a direction of an arrow Z (FIGS. 1 and 2).

The lens-barrel 10 stores and holds a collimator lens 2 and an aperture 16 in one end portion. The other end portion of the lens-barrel 10 is fitted on the other end portion of the cylindrical portion of the fixation holder 8. The lens-barrel 10 is formed of a transparent resin material such as polysulfone, so as to allow easy transmission of an ultraviolet ray (to be described later). Two collars 17a and 17b as holding portions are integrally formed so as to project from the outer circumferential surface of the lens-barrel 10. Six slits 15a, 15b, and 15c (the remaining three slits are not shown) extending in an optical axis direction (the direction of the arrow Z) are formed at equal angular intervals on the fitting portion of the lens-barrel 10 onto the fixation holder 8, i.e., a portion opposite to the collimator lens 2 with respect to the two collars 17a and 17b. An annular gap 19 is defined between the inner circumferential surface of the fitting portion of the lens-barrel 10 and the outer circumferential surface of the cylindrical portion of the fixation holder 8, and an ultraviolet curing adhesive 18 is uniformly filled in the gap 19. Before the ultraviolet curing adhesive 18 is cured, the lens-barrel 10 is movable with respect to the fixation holder 8 in the optical axis direction Z and in two-dimensional directions (directions of arrows X and Y in FIGS. 1 and 2) on a plane perpendicular to the optical axis direction.

A laser beam emitted from the semi-conductor laser light source 1 is collimated by the collimator lens 2, and the collimated beam is beam-shaped into a cylindrical shape by the aperture 16. Upon adjustment of the focusing and irradiating positions, the lens-barrel 10 is moved in the optical axis direction Z, and is held at a position where the diameter of the laser beam 12 has a minimum value, thereby adjusting the focusing position. Then, the lens-barrel 10 is moved in the two-dimensional directions (the directions of the arrows X and Y) on the plane perpendicular to the optical axis direction Z, so that the optical axis of the semi-conductor laser light source 1 coincides with that of the lens-barrel 10, thereby adjusting the irradiating position. Thereafter, an ultraviolet ray is radiated from an ultraviolet radiating device (not shown; to be described later) onto the fitting portion of the lens-barrel 10 to cure the ultraviolet curing adhesive 18, thereby fixing the lens-barrel 10 to the fixation holder 8.

In order to shorten the curing time of the ultraviolet curing adhesive 18, to minimize a positional shift of the collimator lens 2 caused by thermal deformation of the lens-barrel 10 upon radiation of the ultraviolet ray, and to uniformly fill the adhesive, the six slits 15a, 15b, and 15c are formed on the circumferential surface of the lens-barrel 10, as described above. In addition, in order to provide the heat dissipation effect of heat generated by the semi-conductor laser light source 1, the fixation holder 8 comprises a metal member.

An automatic adjustment apparatus for adjusting the focusing and irradiating positions of the optical apparatus for emitting light of this embodiment will be described below.

Figure 4:
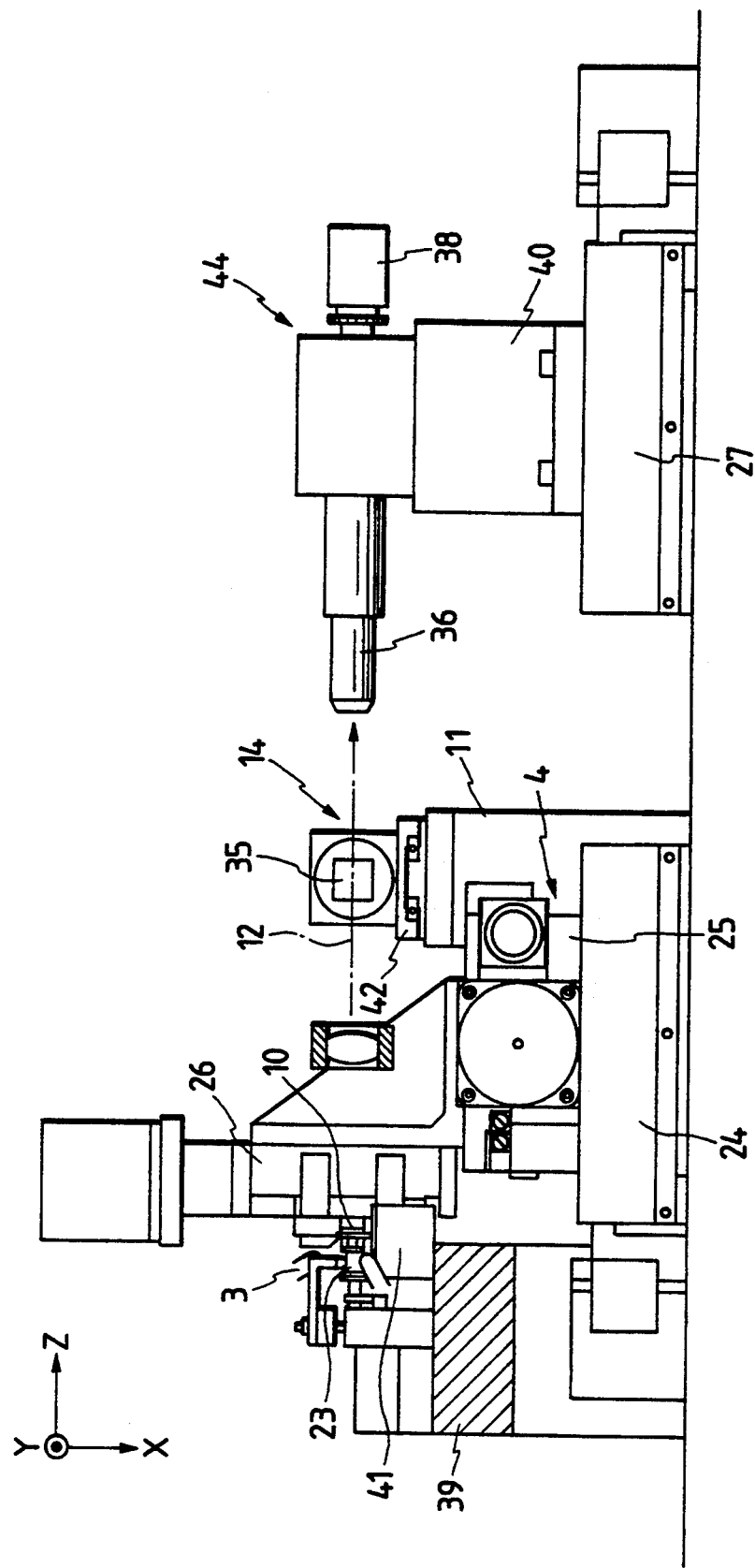
FIG. 4 is a schematic front view of the optical apparatus for emitting light shown in FIGS. 1 and 2, and an apparatus for adjusting focusing and irradiating positions in the optical apparatus for emitting light.
Figure 5:
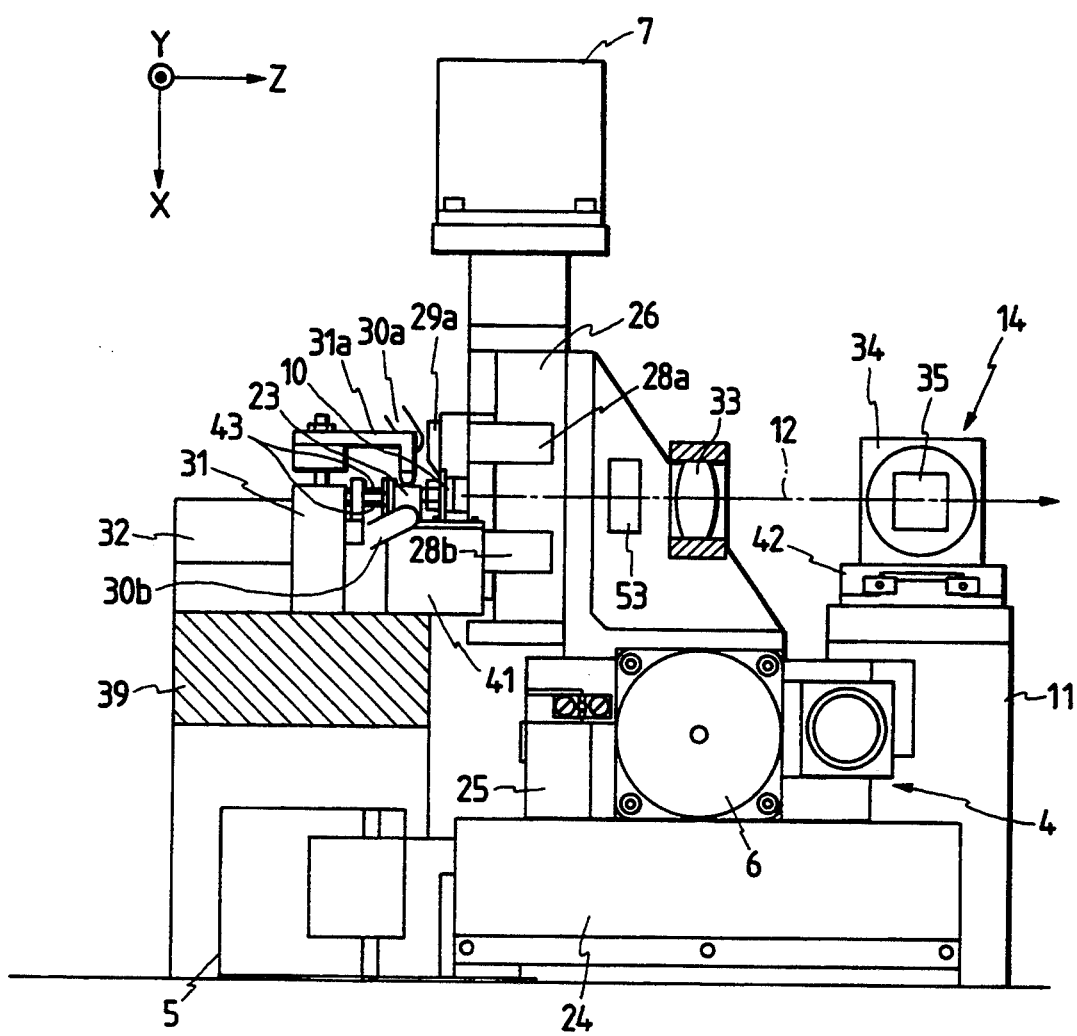
FIG. 5 is an enlarged front view of the optical apparatus for emitting light and a three-dimensional positioning mechanism shown in FIG. 4.
Figure 6:
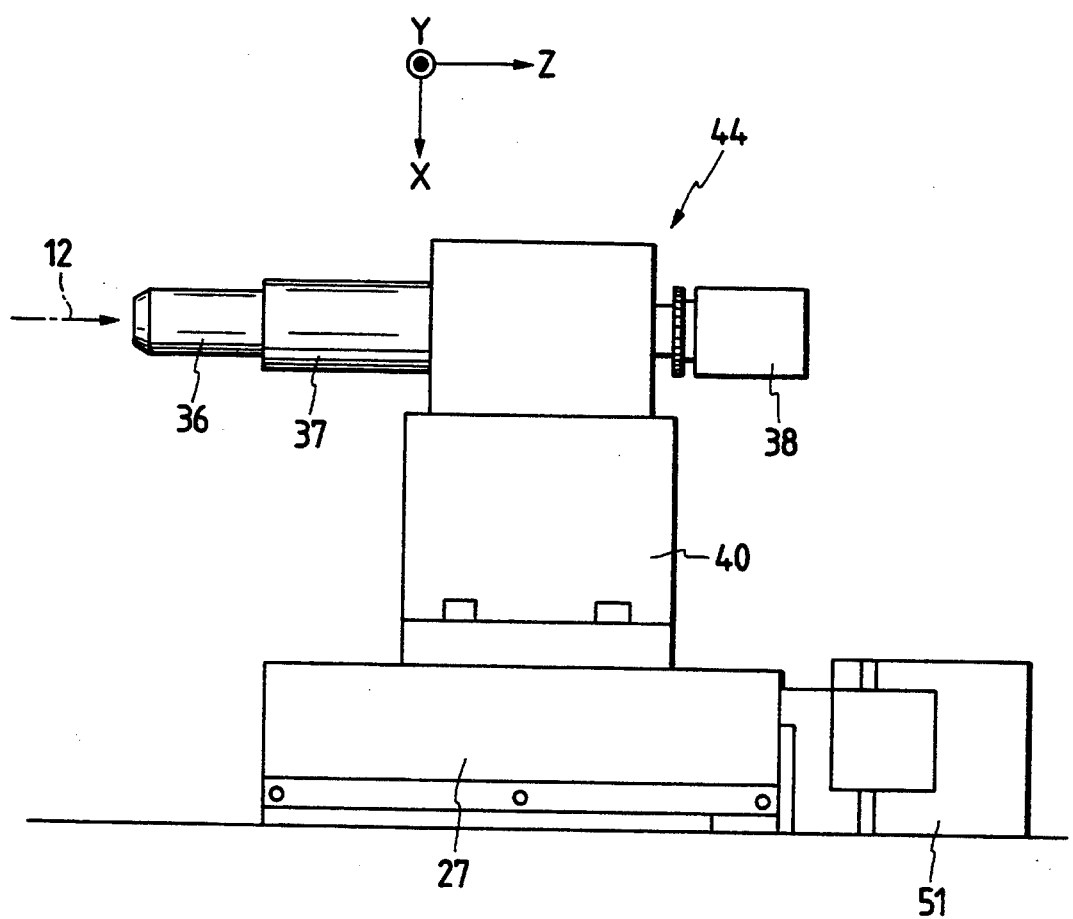
FIG. 6 is an enlarged front view of an enlarging optical system shown in FIG. 4.
Figure 7:
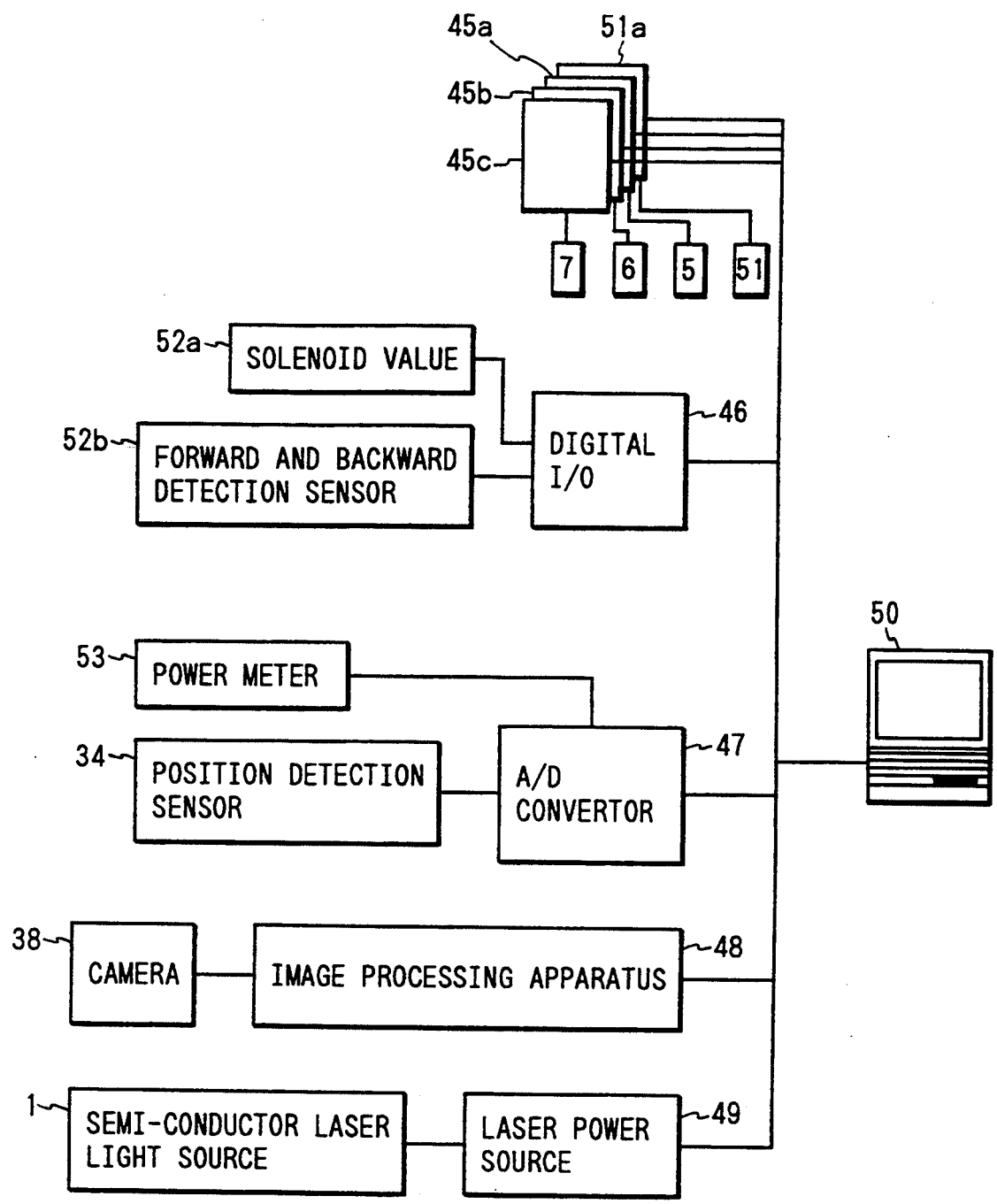
FIG. 7 is a control block diagram of the apparatus for adjusting the focusing and irradiation positions in the optical apparatus for emitting light shown in FIG. 4.
Figure 8:
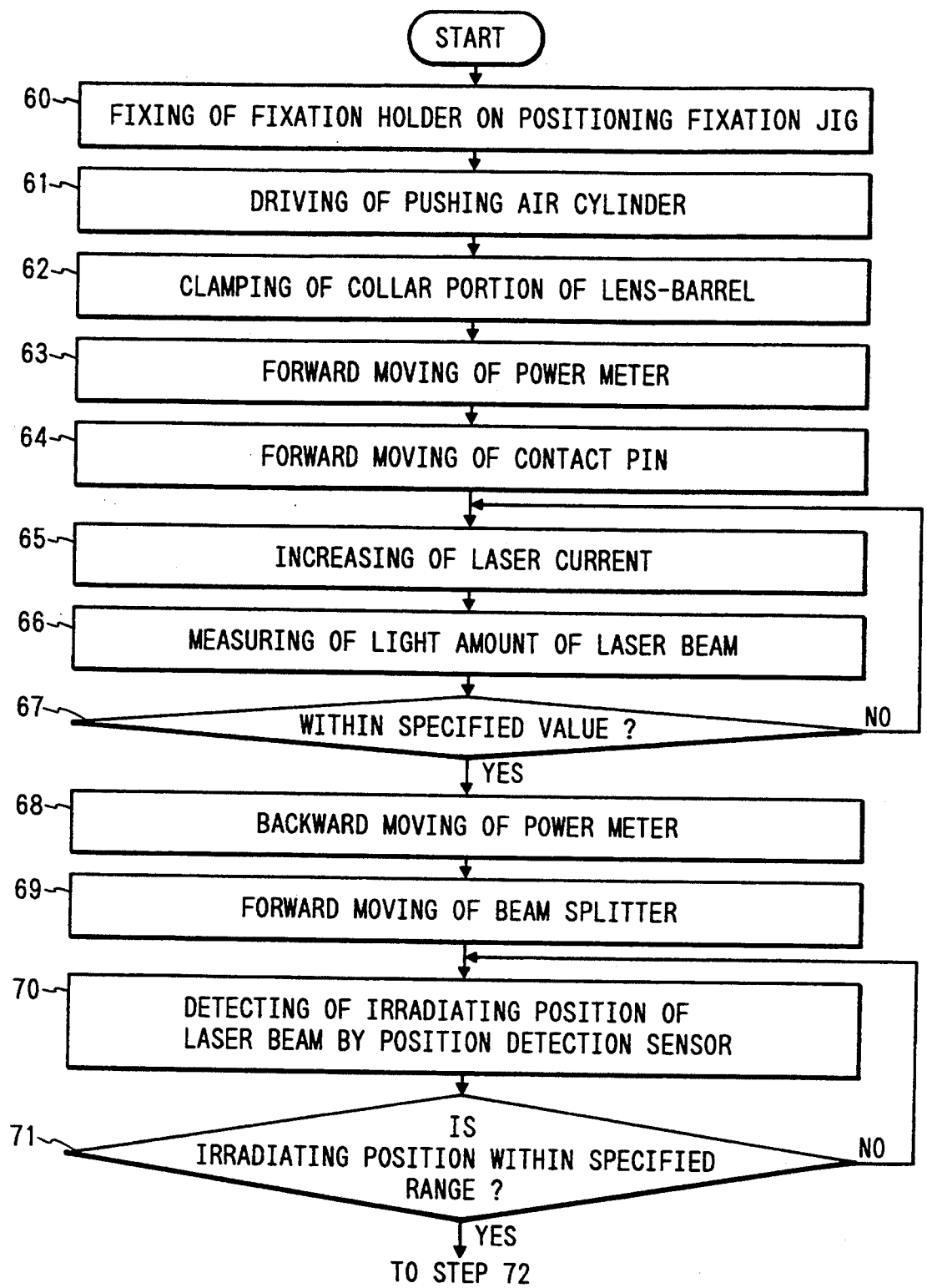
FIG. 8 is a flow chart for explaining the former half of an operation of the apparatus for adjusting the focusing and irradiation positions in the optical apparatus for emitting light shown in FIG. 4.
Figure 9:
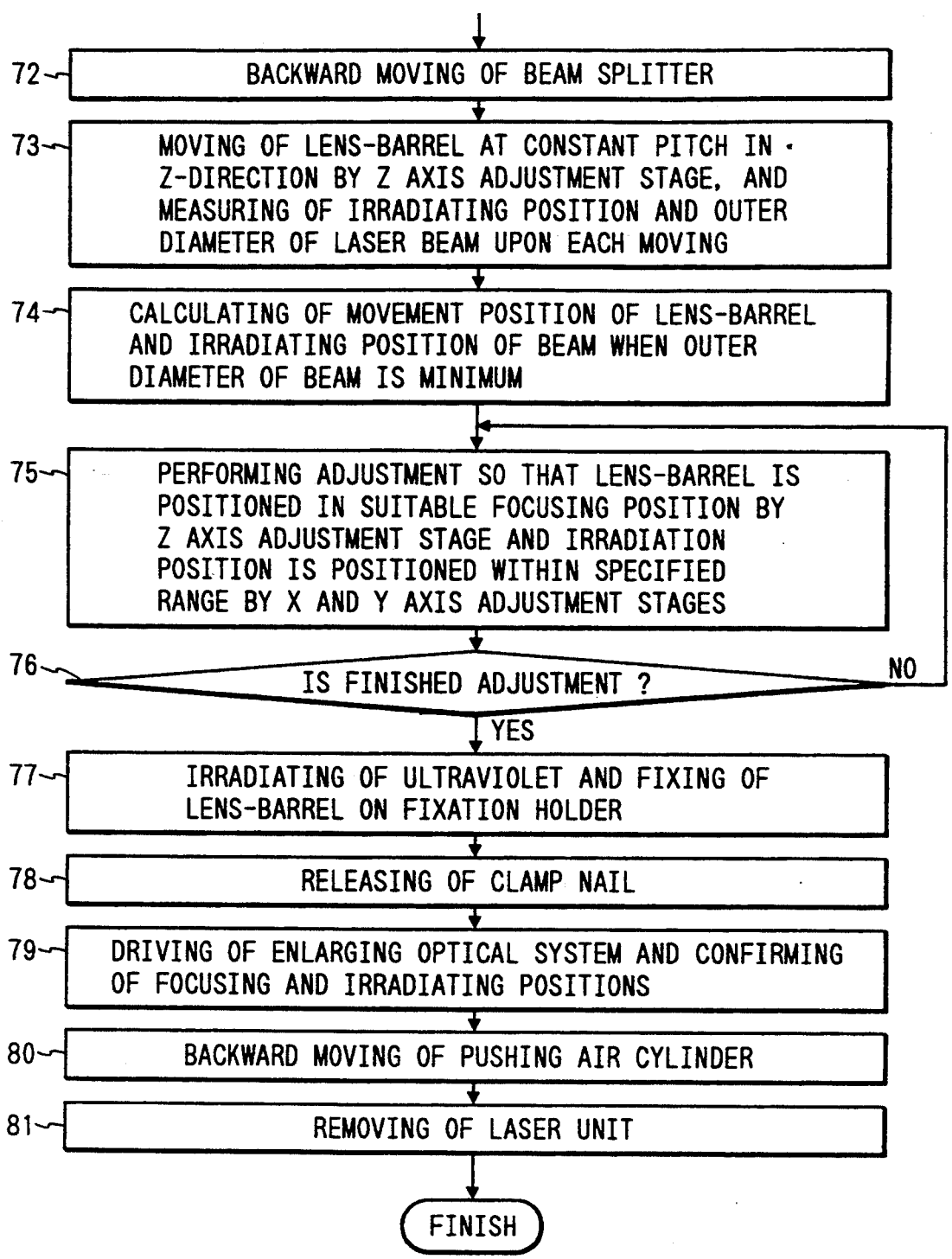
FIG. 9 is a flow chart for explaining the latter half of the operation of the apparatus for adjusting the focusing and irradiation positions in the optical apparatus for emitting light shown in FIG. 4.

FIG. 4 is a schematic front view of the optical apparatus for emitting light shown in FIGS. 1 and 2, and the automatic adjustment apparatus for adjusting the focusing and irradiating positions of the optical apparatus for emitting light, FIG. 5 is an enlarged front view showing the optical apparatus for emitting light and a three-dimensional positioning mechanism shown in FIG. 4, FIG. 6 is an enlarged front view of an enlarging optical system shown in FIG. 4, FIG. 7 is a control block diagram of the automatic adjustment apparatus for adjusting the focusing and irradiating positions of the optical apparatus for emitting light shown in FIG. 4, FIG. 8 is a flow chart for explaining the former half of an operation of the automatic adjustment apparatus for adjusting the focusing and irradiating positions of the optical apparatus for emitting light shown in FIG. 4, and FIG. 9 is a flow chart for explaining the latter half of the operation.

As shown in FIG. 4, the automatic adjustment apparatus for adjusting the focusing and irradiating positions of the optical apparatus for emitting light according to this embodiment includes the optical apparatus 23 for emitting light (FIGS. 1 and 2) fixed to a positioning fixation jig 41 of a support base 39, a three-dimensional positioning mechanism 4 having a clamp means for clamping the lens-barrel 10 of the optical apparatus 23 for emitting light, for three-dimensionally moving and positioning the lens-barrel 10, a first position detection means 14, and an enlarging optical system 44 as a second position detection means.

As shown in FIGS. 4 and 5, the positioning fixation jig 41 is fixed on the upper surface of the support base 39 for supporting the optical apparatus 23 for emitting light. The fixation holder 8 (see FIGS. 1 and 2) is positioned in the positioning fixation jig 41 by inserting pins (not shown) of the positioning fixation jig 41 into the positioning hole 22 and the positioning elongated hole 21 of the fixation holder 8 of the optical apparatus 23 for emitting light, respectively. The fixation holder 8 is fixed to the positioning fixation jig 41 by a fixation screw (not shown) extending through the fixation screw hole 20 (see FIG. 1). One end of a substantially L-shaped pressing member 31a is coupled to the output shaft of a pushing air cylinder 31 mounted on the support base 39. The cylindrical portion of the fixation holder 8 is pressed toward the positioning fixation jig 41 by the other end of the member 31a. In this state, the ultraviolet curing adhesive 18 (see FIG. 1) in the lens-barrel 10 is not cured yet. An ultraviolet ray radiation device 3 comprising three quartz fibers 30a and 30b (one quartz fiber is not shown), and an ultraviolet ray generation source is mounted on the support base 39. A power meter 53 measures the light amount of the laser beam 12, and the measurement value is fetched by a personal computer (not shown), as will be described later.

The known three-dimensional positioning mechanism 4 includes a Z-axis adjustment stage 24, which is moved and positioned in the Z-axis direction by a Z-axis pulse motor 5, a Y-axis adjustment stage 25, which is mounted on the Z-axis adjustment stage 24, and is moved and positioned in the Y-axis direction by a Y-axis pulse motor 6, an X-axis adjustment stage 26, which is mounted on the Y-axis adjustment stage 25, and is moved and positioned in the X-axis direction by an X-axis pulse motor 7. The X-axis adjustment stage 26 of the three-dimensional positioning mechanism 4 mounts two clamp air cylinders 28a and 28b as clamp means to be described later. Clamp nails 29a (one clamp nail is not shown) for clamping and holding the two collars 17a and 17b (see FIG. 1) of the lens-barrel 10 are respectively coupled to the output shafts of the clamp air cylinders 28a and 28b.

The first position detection means 14 includes a support base 11 arranged aside the three-dimensional positioning mechanism 4, a slider 42 mounted on the support base 11, and moved in the Y-axis direction by an air cylinder (not shown), a beam splitter 35 and a position detection sensor 34 mounted on the slider 42. The position detection sensor 34 comprises a PSD (trade name; available from Hamamatsu Photonics (K. K.)). In the first position detection means 14, when the beam splitter 35 is moved to a position on the optical axis of the laser beam 12 together with the slider 42 by the air cylinder (not shown), the laser beam 12 emitted from the semi-conductor laser light source 1 (see FIG. 1) is incident on the beam splitter 35, and the optical axis position of reflected light (not shown) of the laser beam 12 is detected by the position detection sensor 34, thereby detecting the optical axis positions, in the directions of the arrows X and Y, of the incident laser beam 12, i.e., the irradiating position of the laser beam 12. A reflection mirror may be used in place of the beam splitter 35.

As shown in FIGS. 4 and 6, the enlarging optical system 44 as the second position detection means includes an optical system moving stage 27 moved and positioned in the direction of the arrow Z by a pulse motor 51, a lens-barrel 37 for holding an enlarging objective lens 36 and a camera 38, which are mounted on the optical system moving stage 27 via a support base 40. In the enlarging optical system 44, the laser beam 12 is incident on the objective lens 36, and is enlarged. The image of the laser beam 12 is photographed in an enlarged scale by the camera 38, and the photographed image of the laser beam 12 is fetched by an image processing apparatus 48 (see FIG. 7). The image processing apparatus 48 executes image processing of the photographed image of the laser beam 12 to detect the outer diameter of the laser beam, and its central position (irradiating position) in the two-dimensional directions of the arrows X and Y. These detection values are transferred to a computer (not shown; to be described later), and it is detected whether or not the detected outer diameter has a minimum value, and the detected central position is an optimal position, i.e., the central position of an image.

Control means for the above-mentioned automatic adjustment apparatus for adjusting the focusing and irradiating positions of the optical apparatus for emitting light will be described below with reference to FIGS. 4 to 6 and FIG. 7.

A laser power source 49 controlled by a personal computer 50 supplies a current to the terminals 1a, 1b, and 1c (see FIG. 1) of the semi-conductor laser light source 1.

The irradiating position in the two-dimensional directions of the laser beam 12 detected by the position detection sensor 34 is converted by an A/D converter 47 into a digital value, and the digital value is input to the personal computer 50. Z-, Y-, and X-axis pulse motor controllers 45a, 45b, and 45c respectively control to drive the Z-, Y-, and X-axis pulse motors 5, 6, and 7 of the three-dimensional positioning mechanism 4, and a pulse motor controller 51a controls to drive the pulse motor 51 of the enlarging optical system 44. The personal computer 50 automatically controls the controllers 45a, 45b, 45c, and 51a for three-dimensionally moving the irradiating position of the laser beam 12 and the lens-barrel 10, and also automatically controls the above-mentioned image processing apparatus 48. Furthermore, the personal computer 50 controls to drive the controllers 45a, 45b, and 45c on the basis of the outer diameter and the central position of the laser beam 12 measured by the image processing apparatus 48 via the camera 38, so that the outer diameter and the central position of the laser beam 12 are respectively a minimum value and an optimal position, thereby automatically adjusting the focusing and irradiating positions, as will be described later. A digital I/O 46 inputs/outputs an open/close signal of a solenoid valve 52a for each air cylinder, and a detection value of a forward and backward detection sensor 52b for each air cylinder.

The operation of the automatic adjustment apparatus for adjusting the focusing and irradiating positions will be described below with also reference to the flow charts of FIGS. 8 and 9.

The optical apparatus 23 for emitting light is positioned on the positioning fixation jig 41 by inserting the two pins (not shown) in the positioning elongated hole 21 and the positioning hole 22 of the fixation plate 8a of the fixation holder 8, and is then fixed thereto by a screw (not shown) (step 60). The pushing air cylinder 31 is driven, so that the optical apparatus 23 for emitting light is pushed by the pressing member 31a and is fixed to the positioning fixation jig 41 (step 61). In this state, the ultraviolet curing adhesive 18 filled in advance in the lens-barrel 10 is not cured yet. The slider 42, and therefore, the beam splitter 35, of the first position detection means 14 is located at a standby position, and the Z-, Y-, and X-axis adjustment stages 24, 25, and 26, and the optical system moving stage 27 also stand by at predetermined standby positions.

The two clamp air cylinders 28a and 28b are driven to close the two clamp nails, thereby clamping and holding the two collars 17a and 17b of the lens-barrel 10 (step 62). A power meter 53 is moved forward by an air cylinder (not shown), so that it is located on the output optical axis of the semi-conductor laser light source 1 (step 63). A contact pin moving air cylinder 32 is driven to bring contact pins 43 into contact with predetermined portions of the electrical circuit board 9 of the optical apparatus 23 for emitting light (step 64), and a current is gradually supplied from the laser power source 49 to the semi-conductor laser light source 1 according to a command from the personal computer 50, thus causing the semi-conductor laser light source 1 to emit light (step 65). The light amount of the laser beam 12 emitted from the semi-conductor laser light source 1 is measured by the power meter 53 (step 66), and the measurement value is fetched by the personal computer 50 via the A/D converter 47. When the laser power reaches a specified value, increasing of the current is stopped (step 67), and thereafter, the power meter 53 is moved backward (step 68). The output laser beam 12 is substantially collimated by the collimator lens 2 incorporated in the lens-barrel 10, and is beam-shaped into a cylindrical shape by the aperture 16. The beam is then focused by a jig lens 33, and is incident on the objective lens 36 of the enlarging optical system 44.

However, before adjustment of the irradiating position of the lens-barrel 10, the position of the lens-barrel 10 in the directions of the arrows X and Y may often be shifted as largely as not to allow the laser beam 12 to become incident on the objective lens 36 of the enlarging optical system 44. In this case, the slider 42 of the first position detection means 14 is driven by an air cylinder (not shown), and the beam splitter 35 on the slider 42 is moved forward until it reaches a position on the optical axis of the laser beam 12 (step 69). The irradiating position, in the directions of the arrows X and Y, of reflected light (not shown) of the laser beam 12 reflected by the beam splitter 35 is detected by the position detection sensor 34 (step 70). The position detection sensor 34 outputs as analog values the positions of centers of gravity, in the directions of the arrows X and Y, of the light amount of the laser beam 12 to the A/D converter 47, and these values are fetched by the personal computer 50 via the A/D converter 47.

Referring back to FIG. 8, if the difference between the position of the center of gravity of the laser beam 12 and the irradiating position original point falls outside a specified range (step 71), the personal computer 50 controls to drive the Y- and X-axis pulse motor controllers 45b and 45c based on the calculation value, thereby moving the Y- and X-axis adjustment stages 25 and 26 in the directions of the arrows X and Y until the measurement value of the irradiating position falls within the specified range. In this manner, the irradiating position is coarsely adjusted, so that the laser beam 12 is incident on the enlarging optical system 44.

The slider 42 is moved backward by the air cylinder (not shown), and the beam splitter on the slider 42 is moved backward to its standby position (step 72).

Figure 10:
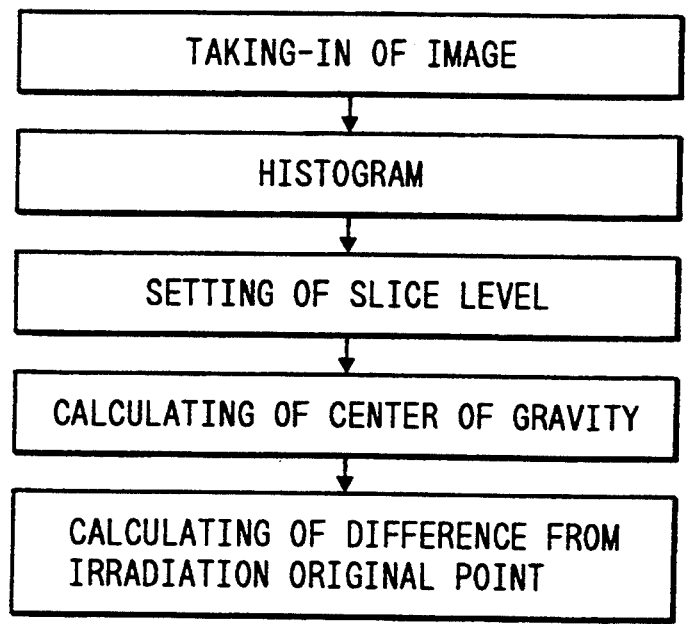
FIG. 10 is a flow chart showing an irradiating position calculation routine.
Figure 11:
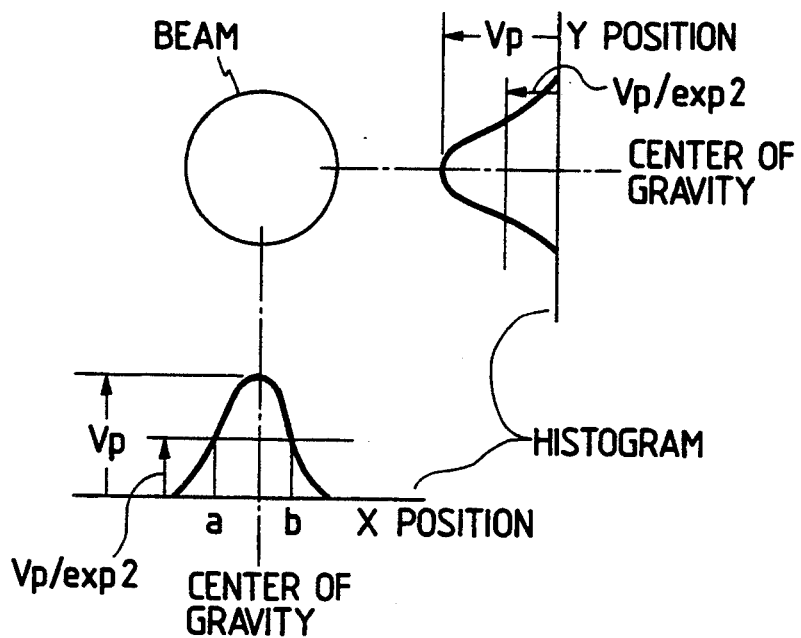
FIG. 11 is a view for explaining the irradiating position calculation.

The Z-axis pulse motor controller 45a is controlled to be driven according to a command from the personal computer 50, and the Z-axis adjustment stage 24, and hence, the lens-barrel 10 is moved in the direction of the arrow Z within a range of about ±0.6 mm of the best focusing position estimated from the laser unit outer dimensions. Then, the moving amount of the lens-barrel 10, the irradiating position, and the beam diameter are fetched. The irradiating position is measured as follows. As shown in FIGS. 10 and 11, the personal computer 50 executes image processing of the fetched laser beam data, and forms histograms in the directions of the arrows X and Y by plotting sensor outputs. The quotient obtained by dividing a peak value Vp of each histogram by exp2 is defined as a slice level, and the positions of centers of gravity in the directions of the arrows X and Y are calculated for data exceeding the slice level by the personal computer 50 according to the following formula (1). The moving amount of the lens-barrel 10 is measured by counting moving command pulses of the Z-axis adjustment stage 24 by the personal computer 50.

Center of gravity =

$$\left[\sum_{i=a}^{b}\{(V_i - V_p/\exp 2) \times i\}\right] / \left[\sum_{i=a}^{b}(V_i - V_p/\exp 2)\right] \quad (1)$$

Figure 12:
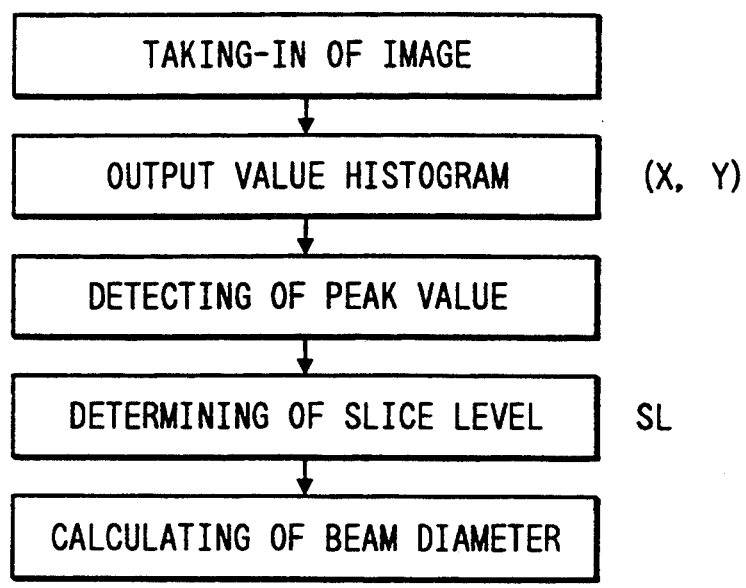
FIG. 12 is a flow chart showing a beam outer diameter calculation routine.
Figure 13:
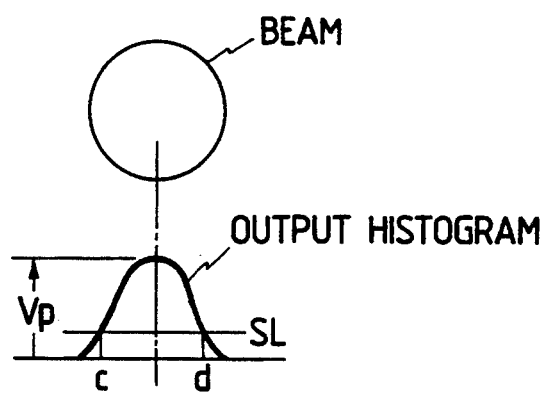
FIG. 13 is a view for explaining the beam outer diameter calculation.

The beam diameter is measured as follows. As shown in FIGS. 12 and 13, histograms are formed in the directions of the arrows X and Y on the basis of an image fetched by the camera 38 as in the case of the irradiating position, and their peak values are detected. A slice level SL is determined based on each detected peak value Vp using the following formula (2), and the number of pixels of the laser beam diameter is calculated on the basis of crossing point coordinates c and d between the slice level SL and the histogram. The calculated value is multiplied with the resolution of the camera 38 to obtain the laser beam diameter (step 73).

$$SL = V_p/e^2 \quad (2)$$

where e is the base of a natural logarithm.

The movement position of the lens-barrel 10 obtained when the outer diameter of the image of the laser beam 12 has a minimum value corresponds to the just focusing position. The movement position of the lens-barrel 10 at that time is calculated by the personal computer 50, and the irradiating position of the beam at that time is also calculated (step 74).

Thereafter, the personal computer 50 controls to drive the Z-, Y-, and X-axis pulse motor controllers 45a, 45b, and 45c on the basis of the calculation results, and the Z-, Y-, and X-axis adjustment stages 24, 25, and 26 are sequentially moved and adjusted, so that the lens-barrel is three-dimensionally located at the proper focusing position and the optimal irradiating position (steps 75 and 76).

An ultraviolet ray is radiated from the ultraviolet ray radiating device 3 onto the lens-barrel 10 via the quartz fibers 30a and 30b (there are three fibers although one fiber is not shown) so as to cure the ultraviolet curing adhesive 18 (see FIG. 1), thereby fixing the lens-barrel 10 to the holder 8 (step 77). Thereafter, the two clamp nails 29a are released (step 78), and the pulse motor controller 51a is controlled to be driven according to a command from the personal computer 50. Thus, the enlarging optical system 44 is moved in the direction of the arrow X by the optical system moving stage 27. The movement position of the enlarging optical system 44 is fetched by the personal computer 50, and the irradiating position of the image and the beam diameter of the laser beam 12 measured by the image processing apparatus 48 are also transferred to the personal computer 50 as in the above-mentioned adjustment. The personal computer 50 confirms if the focusing and irradiating positions fall within specified ranges (step 79). Thus, the adjustment is finished. Finally, the pushing air cylinder 31 is moved backward, and the screw is removed (step 80) so as to remove the optical apparatus 23 for emitting light as the laser unit from the positioning fixation jig 41 (step 81). Then, the next sample is attached to the jig 41 (step 60), and the operations in steps 61 to 81 are repeated. (Another Embodiment)

In the above-mentioned embodiment, the focusing position is measured on the basis of the laser beam diameter. However, the present invention is not limited to this. For example, the focusing position may be measured based on the peak value of the light amount of the laser beam. A method of measuring the light amount of the laser beam will be described below with reference to FIG. 14.

Figure 14:
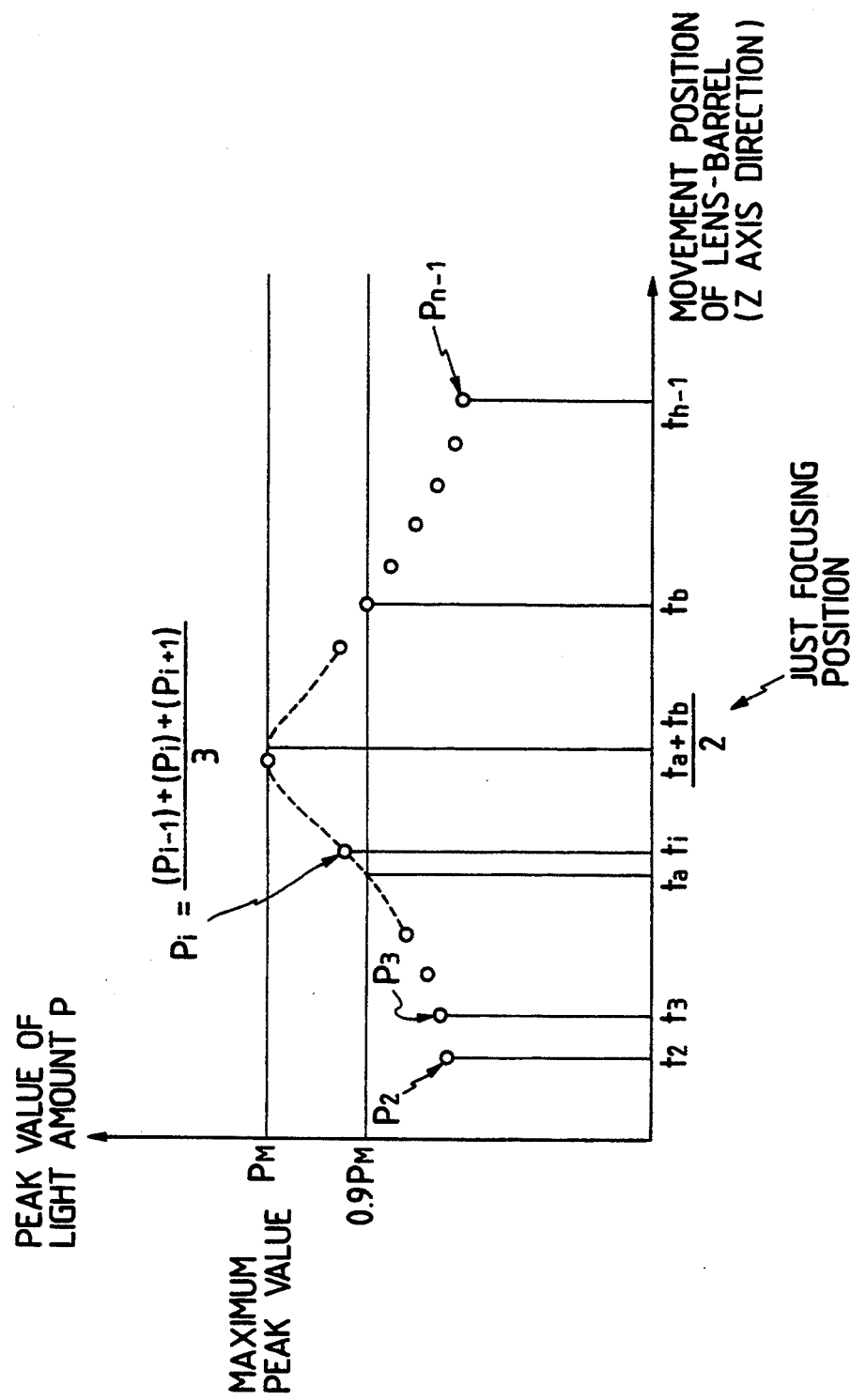
FIG. 14 is a graph for explaining a measurement of the light amount of a laser beam associated with the apparatus for adjusting the focusing and irradiation positions in the optical apparatus for emitting light according to the present invention.
Figure 15:
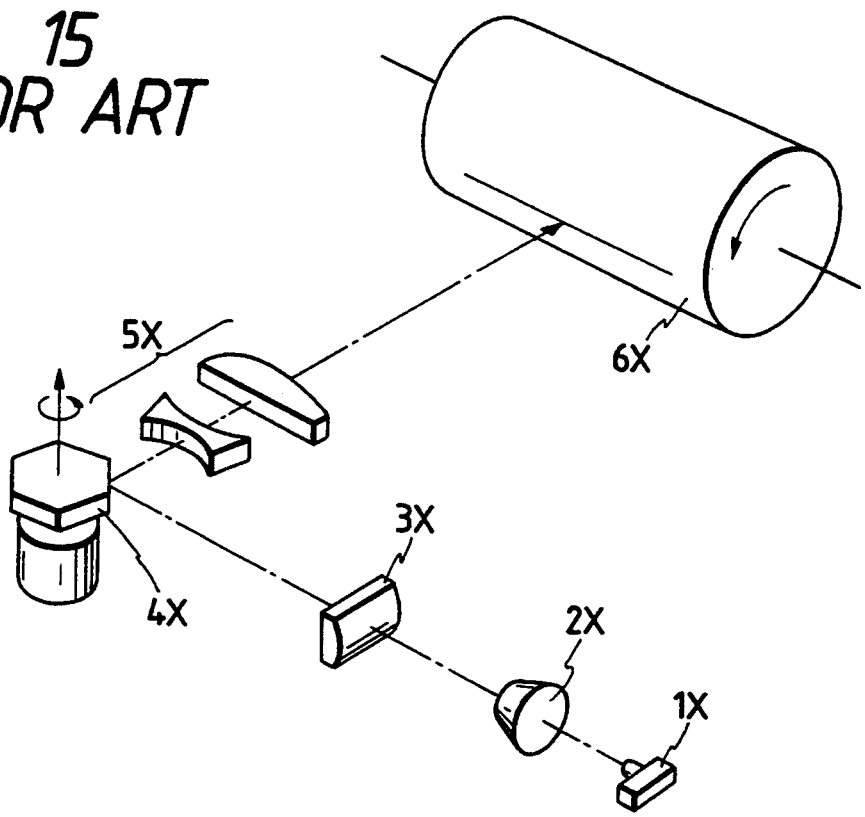
FIG. 15 is a schematic perspective view showing a laser scanning apparatus comprising a conventional optical apparatus for emitting light (laser unit)
Figure 16:
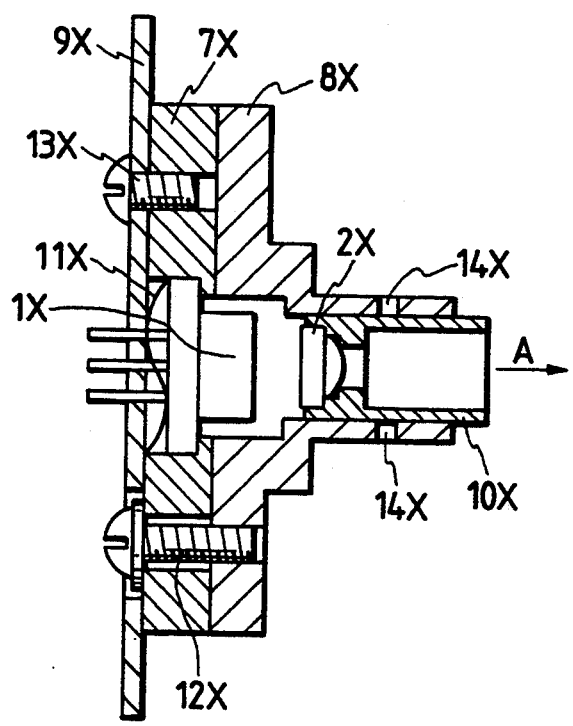
FIG. 16 is a longitudinal sectional view of the conventional optical apparatus for emitting light (laser unit).

The lens-barrel 10 is gradually moved in the direction of the arrow Z by the Z-axis adjustment stage 24, and the position of the lens-barrel 10 is measured by counting moving pulses by the personal computer 50. At the same time, the peak value of the light amount of the laser beam 12 incident on the camera 38 (in practice, the peak value on the entire field of view of the camera) is fetched by the personal computer 50 via the image processing apparatus 48. As shown in FIG. 14, if the movement position is represented by t, and the peak value of the light amount is represented by p, data $(t_1, p_1), (t_2, p_2), \ldots, (t_i, p_i), \ldots, (t_n, p_n)$ are obtained. In this case, a moving average is calculated to remove a noise component of the light amount. That is, the movement position and the peak value of the light amount are represented by $(t_i, ((p_{i-1})+(p_i)+(p_{i+1}))/3)$. The maximum value of all the peak values of the light amount is calculated, and a value 90% the maximum value is defined as a slice level. If the movement positions of the lens-barrel 10 at crossing points between the slice level and a histogram of the light amount are represented by $t_a$ and $t_b$, the just focusing position is expressed by $(t_a+t_b)/2$.

As described above, according to the present invention, since the focusing and irradiating positions of the optical apparatus for emitting light can be simultaneously adjusted by moving the lens-barrel alone, the adjustment time can be shortened, and the adjustment yield can be improved. In addition, a low-cost, compact apparatus can be realized since the number of components is decreased.

Since the focusing and irradiating positions are automatically adjusted by moving the lens-barrel, high-precision adjustment is assured, and reliability of adjustment can be improved.

What is claimed is:

1. An optical apparatus for emitting light, comprising:
a holder on which a semi-conductor laser light source is mounted; and
a lens-barrel in which a collimator lens for collimating a laser light emitted from the semi-conductor laser light source is mounted,
wherein said holder and said lens-barrel are fixed by adhering after a relative position therebetween has been adjusted spatially.

2. An optical apparatus for emitting light, comprising:
a semi-conductor laser light source;
a fixation holder for holding said semi-conductor laser light source;
a collimator lens for collimating a laser beam emitted from said semi-conductor laser light source; and
a lens-barrel being a substantially hollow member formed of a transparent material, for incorporating and holding said collimator lens, having collars on an outer surface thereof, being formed with slits extending in an optical axis direction on a portion opposite to said collimator lens with respect to said collars, and being fitted onto said fixation holder via a predetermined gap at the portion where the slits are formed so that said lens-barrel is movable in the optical axis direction and in two-dimensional directions on a plane perpendicular to the optical axis direction, wherein said lens-barrel is positioned and fixed to said fixation holder by curing an adhesive filled in the gap in the fitting portion between said lens-barrel and said fixation holder.

3. An apparatus according to claim 2, wherein said lens-barrel and the portion of said fixation holder onto which said lens-barrel is fitted, each have a substantially cylindrical shape.

4. An automatic adjustment apparatus for adjusting focusing and irradiating positions of an optical apparatus according to claim 2 or 3, comprising:

positioning fixation means for positioning and fixing said fixation holder;

clamp means for holding said collars of said lens-barrel;

a three-dimensional positioning mechanism, mounting said clamp means, for moving and positioning said lens-barrel held by said clamp means in the optical axis direction and in two-dimensional directions on a plane perpendicular to the optical axis direction;

first position detection means for detecting a coarse irradiating position in the two-dimensional directions of a laser beam transmitted through said collimator lens;

second position detection means for detecting an outer diameter and a central position in the two-dimensional directions of the laser beam transmitted through said collimator lens;

control means for determining based on the input irradiating position detected by said first position detection means whether the irradiating position is located within a specified range or not, for controlling said three-dimensional positioning mechanism so as to move said lens-barrel to a position where said second position detection means detects that the outer diameter and the central position in the two-dimensional directions of the laser beam are respectively a minimum value and a proper position if the irradiating position falls within the specified range, and controlling said three-dimensional positioning mechanism so as to move said lens-barrel to a position where the irradiating position falls within the specified range if the irradiating position falls outside the specified range, thereafter, controlling said three-dimensional positioning mechanism so as to move said lens-barrel to the position where said second position detection means detects that the outer diameter and the central position in the two-dimensional directions of the laser beam are respectively a minimum value and a proper position; and an ultraviolet ray radiating device for curing the adhesive after said positioning.

5. An automatic adjustment apparatus for adjusting focusing and irradiating positions of an optical apparatus according to claim 2 or 3, comprising:

positioning fixation means for positioning and fixing said fixation holder;

clamp means for holding said collars of said lens-barrel;

a three-dimensional positioning mechanism, mounting said clamp means, for moving and positioning said lens-barrel held by said clamp means in the optical axis direction and in two-dimensional directions on a plane perpendicular to the optical axis direction;

first position detection means for detecting a coarse irradiating position in the two-dimensional directions of a laser beam transmitted through said collimator lens;

second position detection means for detecting a peak value of a light amount and a central position in the two-dimensional directions of the laser beam transmitted through said collimator lens;

control means for determining based on the input irradiating position detected by said first position detection means whether the irradiating position is located within a specified range or not, for controlling said three-dimensional positioning mechanism so as to move said lens-barrel to a position where said second position detection means detects that the peak value of the light amount and the central position in the two-dimensional directions of the laser beam are respectively a maximum value and a proper position if the irradiating position falls within the specified range, and controlling said three-dimensional positioning mechanism so as to move said lens-barrel to a position where the irradiating position falls within the specified range if the irradiating position falls outside the specified range, thereafter, controlling said three-dimensional positioning mechanism so as to move said lens-barrel to the position where said second position detection means detects that the peak value of the light amount and the central position in the two-dimensional directions of the laser beam are respectively a maximum value and a proper position; and an ultraviolet ray radiating device for curing the adhesive after said positioning.

* * * * *

UNITED STATES PATENT AND TRADEMARK OFFICE
CERTIFICATE OF CORRECTION

PATENT NO. : 5,351,264
DATED : September 27, 1994
INVENTOR(S) : MASATOSHI KATO, ET AL.

It is certified that error appears in the above-indentified patent and that said Letters Patent is hereby corrected as shown below:

COLUMN 4:

Line 36, "To" should read --to--.

Line 47, "with" should read --within--.

COLUMN 11:

Line 61, "Jig 41" should read --jig 41--.

Line 63, "(Another" should read -- ¶ (Another--.

Signed and Sealed this

Thirtieth Day of May, 1995

Attest:

BRUCE LEHMAN

*Attesting Officer*       *Commissioner of Patents and Trademarks*